United States Patent
Egri et al.

(10) Patent No.: US 7,489,265 B2
(45) Date of Patent: Feb. 10, 2009

(54) VEHICLE SENSOR SYSTEM AND PROCESS

(75) Inventors: Robert Gyorgy Egri, Wayland, MA (US); Michael John Paradie, Nashua, NH (US); Shuangqing Wei, Baton Rouge, LA (US)

(73) Assignee: Autoliv ASP, Inc., Ogden, UT (US)

( * ) Notice: Subject to any disclaimer, the term of this patent is extended or adjusted under 35 U.S.C. 154(b) by 60 days.

(21) Appl. No.: 11/120,298

(22) Filed: May 2, 2005

(65) Prior Publication Data

US 2006/0152405 A1    Jul. 13, 2006

Related U.S. Application Data

(60) Provisional application No. 60/643,504, filed on Jan. 13, 2005.

(51) Int. Cl.
    *G01S 13/00*      (2006.01)
    *G01S 13/74*      (2006.01)

(52) U.S. Cl. .......................... 342/70; 342/45

(58) Field of Classification Search .................. 342/70; 375/96; 702/183
See application file for complete search history.

(56) References Cited

U.S. PATENT DOCUMENTS

| | | |
|---|---|---|
| 3,253,277 A | 5/1966 | Preston et al. |
| 3,315,258 A | 4/1967 | Dillard |
| 4,136,340 A * | 1/1979 | Bishop .................. 342/45 |
| 4,860,321 A * | 8/1989 | von der Embse ............ 375/343 |

(Continued)

FOREIGN PATENT DOCUMENTS

EP      0 809 118 A1      11/1997

(Continued)

OTHER PUBLICATIONS

BOLD noise assumptions in fMRI, 2004, Chapter 2, p. 38, http://www3.stat.sinica.edu.tw/library/c_tec_rep/2003-01.pdf.*

(Continued)

*Primary Examiner*—Thomas H Tarcza
*Assistant Examiner*—Harry Liu
(74) *Attorney, Agent, or Firm*—Saul Ewing LLP; Stephen J. Driscoll

(57) ABSTRACT

A process of determining target parameters of an object within a field of detection of an automotive radar system, the process comprising the steps of: (a) establishing a target range from a sequence of ranges; (b) dwelling on the target range for an initial dwell time to obtain sensor data; (c) determining if the sensor data corresponds to the presence of an object or to the absence of an object at the target range based on probability density distributions of an object being present and being absent at the target range, and if such the determination cannot be made, then repeating steps (b)-(c) until the determination can be made; (d) if the sensor data is determined to correspond to the presence of an object in step (c), then dwelling at the target range for an extended dwell time to obtain additional sensor data for determining the target parameters of the object before proceeding to step (e); and (e) establishing the next of the sequence of ranges as the target range before reiterating steps (b)-(e).

24 Claims, 3 Drawing Sheets

U.S. PATENT DOCUMENTS

| | | | | |
|---|---|---|---|---|
| 5,410,492 | A * | 4/1995 | Gross et al. | 702/185 |
| 5,459,675 | A * | 10/1995 | Gross et al. | 702/183 |
| 6,087,976 | A * | 7/2000 | Reed et al. | 342/70 |
| 6,131,076 | A * | 10/2000 | Stephan et al. | 702/189 |
| 6,407,696 | B1 | 6/2002 | Neben et al. | |
| 6,664,918 | B2 * | 12/2003 | Paradie et al. | 342/70 |
| 6,975,962 | B2 * | 12/2005 | Wegerich et al. | 702/182 |
| 2001/0033246 | A1 * | 10/2001 | Burchett et al. | 342/91 |
| 2003/0126258 | A1 * | 7/2003 | Conkright et al. | 709/224 |
| 2004/0227661 | A1 * | 11/2004 | Godsy | 342/70 |
| 2004/0252668 | A1 * | 12/2004 | Ozukturk et al. | 370/335 |
| 2005/0114023 | A1 | 5/2005 | Williamson et al. | |
| 2005/0271120 | A1 * | 12/2005 | Hoctor | 375/138 |
| 2006/0031015 | A1 * | 2/2006 | Paradie | 701/301 |

FOREIGN PATENT DOCUMENTS

| | | |
|---|---|---|
| WO | WO 98/32030 | 7/1998 |
| WO | WO 99/36920 | 7/1999 |
| WO | WO 03/016943 A1 | 2/2003 |

OTHER PUBLICATIONS

BOLD noise assumptions in fMRI, conclusion on p. 38 http://dissertations.ub.rug.nl/FILES/faculties/science/2004/a.m.wink/c2.pdf.*

European Search Report, Application No. EP 06 10 0254.

Marcus M. B., Swerling P.: "Sequential detection in radar with multiple resolution elements" IRE Transactions on Information Theory, vol. IT-1, No. 3, Dec. 1955, pp. 5-18, XP009092696 New York (US).

Bussgang J. J., Middleton D.: "Optimum sequential detection of signals in noise" IRE Transactions on Information Theory, vol. IT-1, No. 3, Dec. 1955, pp. 5-18, XP009092696 New York (US).

* cited by examiner

VEHICLE SENSOR SYSTEM AND PROCESS

CROSS REFERENCE TO RELATED APPLICATIONS

The present application is based on and entitled to the priority of Provisional Application No. 60/643,504, filed on Jan. 13, 2005, which is incorporated herein by reference.

FIELD OF THE INVENTION

The present invention relates generally to a system and process for detecting the presence of an object around a vehicle, and, more specifically, to a vehicle radar system and process which detects the presence of an object and estimates its parameters with reduced radio frequency (RF) transmissions and computational overhead.

BACKGROUND OF THE INVENTION

The popularity of vehicle sensing systems continues to increase. These systems serve to detect and track objects in relation to a moving vehicle. Examples of vehicle sensing systems include radars to support long range applications such as auto cruise control (ACC), and short-range radar (SRR) to support shorter range applications, such as parking aid, stop & go, and pre-crash detection. Of particular interest herein, is SRR.

In its current implementation, SRR is a 24-GHz coherent pulse radar which was designed for installation on automotive vehicles and is capable of detecting objects in range and bearing from 0 to 30 meters. To this end, the radar "dwells" at a particular discrete range to search for the presence of objects at that range before indexing to the next in a sequence of discrete ranges. Typical systems complete one 0-30 meter sweep during every 40-millisecond cycle. Object range of the object is determined from the particular range in which the object is observed. Estimation of the object's other target parameters (e.g., bearing), however, requires additional information that is made available through the radar's switched-beam monopulse design. In particular, the radar can switch between two overlapping antenna patterns, which will be referred to as the sum beam and the difference beam. Object bearing is calculated using signals from each antenna beam, as prescribed by monopulse theory.

Although gaining in popularity, SRR and other vehicle sensing systems continue to face significant problems. Among the more significant problems is the dwell time associated with determining target parameters. Specifically, sufficient dwelling to estimate target parameters is often implemented at each range, even if no object is present. This tends to slow the system's overall operation which can be particularly problematic in vehicle sensing systems since often the vehicle and the object are both moving rapidly, thereby necessitating essentially immediate detection of objects.

Therefore, there is a need for a vehicle sensing system which is more efficient in determining target parameters to increase operational speed, minimize computational overhead and reduce RF emissions. The present invention fulfills this need among others.

SUMMARY OF INVENTION

The present invention provides for a system and process of detecting objects around a vehicle with a reduced expenditure of computational resources and RF emissions. To this end, the system and process of the present invention first determines whether an object is likely to be present at a particular range before dedicating the computational resources and emitting significant RF to determine the target parameters of an object at that range. Specifically, applicants recognize that prior art approaches for detecting objects which dwell for a period that is sufficient, not only to detect the object, but also to calculate its target parameters, are inefficient. To improve efficiency, the applicants apply statistical analysis and probability density distributions to determine whether data obtained initially is consistent with the presence of an object before dwelling longer to determine target parameters.

Accordingly, one aspect of the present invention is a process in which the presence of an object is determined before sufficient data is obtained to determine its target parameters. In a preferred embodiment, the process comprises the steps of: (a) establishing a target range from a sequence of ranges; (b) dwelling on the target range for an initial dwell time to obtain sensor data; (c) determining if the sensor data corresponds to the presence of an object or to the absence of an object at the target range based on probability density distributions of an object being present and being absent at the target range, and, if such the determination cannot be made, then repeating steps (b)-(c) until the determination can be made; (d) if the sensor data corresponds to the presence of an object as determined in step (c), then dwelling at the target range for an extended dwell time to obtain additional sensor data for determining the target parameters of the object before proceeding to step (e); and (e) establishing the next of the sequence of ranges as the target range before reiterating steps (b)-(e).

Another aspect of the present invention is a system comprising at least one computer being configured to perform the steps in the process described above. In another embodiment, the system comprises (a) a data processor; (b) an input for receiving radar data from the vehicle radar system; (c) memory operatively connected to the data processor, the memory containing instructions comprising at least: (i) a detection module for establishing a target range from a sequence of ranges, instructing the vehicle radar system to dwell on the target range for an initial dwell time to obtain radar data, and determining if the radar data corresponds to the presence of an object or to the absence of an object at the target range based on probability density distributions of an object being present and being absent at the target range, and repeating the initial dwell time to collect more radar data if the presence or absence of the object cannot be determined; (ii) a collection module for dwelling at the target range for an extended dwell time after the detection module determine an object to be present to obtain additional sensor data for determining the target parameters of the object; and (iii) a state estimation module for determining target parameters of the object from the addition sensor data.

Still another aspect of the present invention is a vehicle with the vehicle sensing system described above.

DETAILED DESCRIPTION

Described herein is a vehicle sensing system and process for determining the presence of objects around the vehicle quickly and accurately. As used herein, the term "vehicle" refers to any primary entity that moves relative to other objects. Preferably, the vehicle carries one or more people for transportation or entertainment purposes. Examples of such vehicles include automobiles (including cars and trucks), airplanes, boats (including personal watercraft, boats, ships and submarines), and railed vehicles (including trains, trolleys and subways). It is also anticipated that the vehicle may be stationary and the objects are moving relative to it (e.g., a toll both). Preferably, the vehicle is an automobile and the present invention is described herein with respect to an automobile.

As used herein, the term "vehicle sensing system" refers to a vehicle-based sensory system which detects the presence of an object around the vehicle and determines the object's target parameters such as velocity and bearing. Vehicle sensing systems typically target a certain range and "dwell" thereon while gathering data. The data obtained may be a discrete reading or radar pulse, or a series of readings or radar pulses. The quality of the data obtained typically is a function of dwell time, with longer dwell times equating to better quality data (i.e., higher signal-to-noise ratio, which improves the accuracy of determined target parameters). The sensing system may be based on, for example, echoed electromagnetic radiation (e.g. laser, radar), acoustics (e.g., sonar, ultrasound), and thermal imaging (e.g., infrared). Preferably, the detecting system is based on electromagnetic echoing, specifically, radar. In a particularly preferred embodiment, the radar is a short-range radar (SRR). Such systems are well known and the details of which will not be discussed herein in detail. For purposes of illustration, the description herein considers an SRR in detail, although the invention is not limited to this embodiment.

Figure 1:
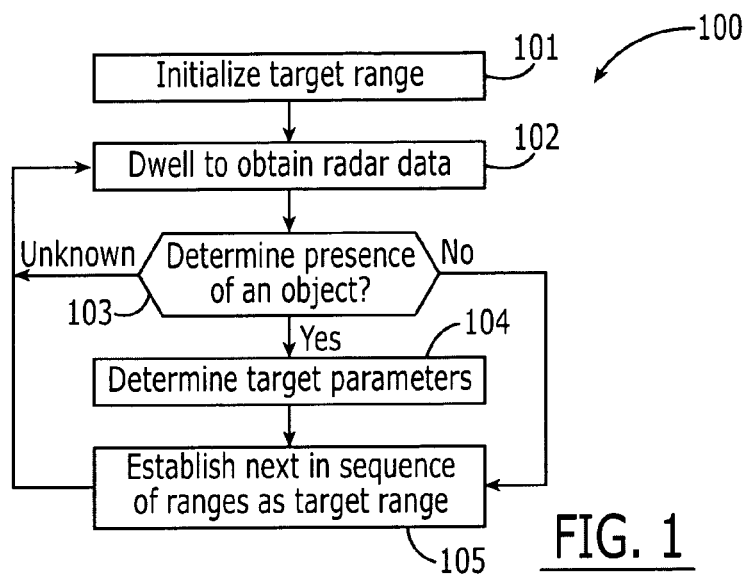
FIG. 1 shows a flow chart of a preferred embodiment of the process of the present invention.

Referring to FIG. 1, a flow chart 100 of the process of the present invention is shown. (It is worthwhile to mention that, although the invention is described herein in terms of steps, this is done to facilitate understanding and is not intended to limit the scope of the invention. Indeed, it is contemplated that the functions of one or more steps may be combined or split among other steps.) In step 101, a target range is initialized from a sequence of ranges. Next, radar data is obtained for the target range in step 102. In step 103, a determination is made whether the data corresponds to the presence of an object or to the absence of an object at the target range based on one or more probability density distributions. If a determination in step 103 can not be made, step 102 is repeated to collect additional data at the same the target range until such a determination can be made. If the radar data corresponds to the presence of an object as determined in step 103, then the target parameters of the object are determined in step 104 before proceeding to step 105. In step 105, the next sequential range is established as the target range before reiterating steps 102-105. The details of this process and its integration into a system are considered below in greater detail.

Figure 2:
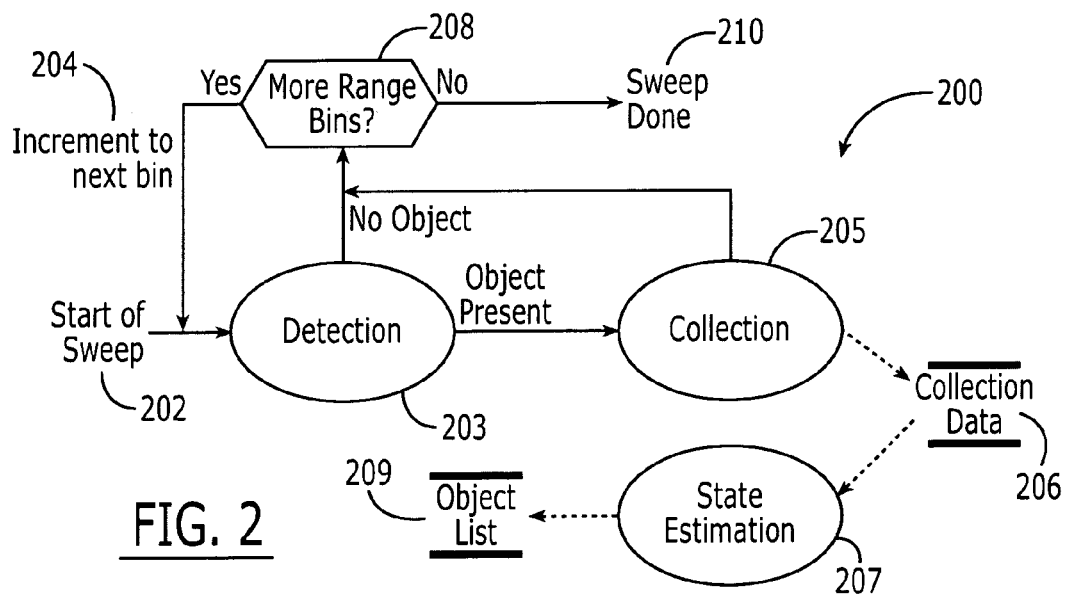
FIG. 2 shows a flow diagram of a preferred embodiment of the system of the present invention.

Referring to FIG. 2, a flow diagram 200 of a preferred embodiment of the system of present invention is shown. In this flow diagram and all flow diagrams in this application, a solid line indicates a control flow and a dashed line indicates a data flow. An ellipse represents a module implementing some functional process; a diamond is a decision; and two parallel lines represent data storage. The process shown in FIG. 2 is performed once per sensor cycle. Cycle times depend on the particular sensing system used. For example, in a SRR system, the sweep time is approximately once per 40 milliseconds.

The process starts at "Start of Sweep" 202, corresponding to the first or initialized range of the sweep. The Detection module 203 determines whether an object is present in the current bin. If no object is detected, then a decision is made in block 208 whether additional ranges need to be considered in the current cycle (i.e., sweep). If so, the radar increments to consider the next range in step 204. If an object is detected, then the Collection module 205 gathers additional radar data at the current range before incrementing to the range in step 204. Every detected object in a bin causes additional radar data to be placed in the Collection Data store 206. The State Estimation module 207 processes these data and places its output in the Object List store 209. This output represents a list of all objects observed during the current cycle. Each object is described in terms of the estimated value of object parameters (i.e., state) that might include range, bearing, and Doppler velocity. The sweep is complete after all ranges have been thus considered, ending at "Sweep Done" 210.

It is important to note that the Collection module is only called for bins containing detected objects. Thus, the detection decision must be performed on the fly because the outcome determines whether additional radar data should be collected. This provides a significant advantage in dwell time for most bins do not contain objects. The time that would have been wasted on empty bins can now be used for other purposes, such as to dwell longer on bins actually containing objects. This improves the accuracy of estimated object parameters, as output into the Object List store.

Figure 3:
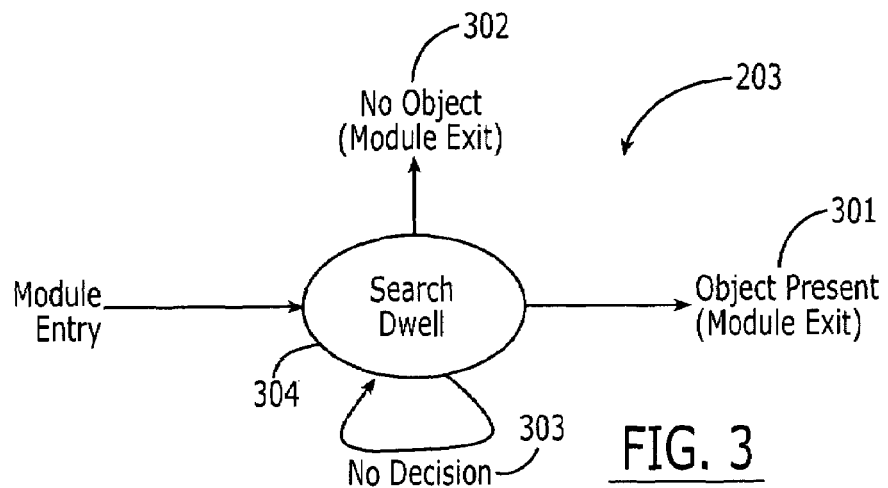
FIG. 3 shows a flow diagram of a preferred embodiment of the detection module of the system shown in FIG. 2.

There is no requirement on the State Estimation module to perform its functionality immediately after the collection of additional radar data in a particular bin. It can perform it immediately, or after all such data have been collected for a particular sweep. The appropriate implementation should be determined based on system-design considerations. Each module function is described in greater detail below Detection Module In step 102, after data of a target range is generated by the sensing system in step 101, it is transmitted to the detection module or a processing unit to determine whether an object is present. FIG. 3 provides a flow diagram for the Detection module 203. This module is responsible for performing an on-the-fly determination of whether the current range bin contains an object. The module 203 has two possible decision outputs: "Object Present" 301 and "No Object" 302. The Detection module 203 implements a sequential detection algorithm. In particular, data of a target range is generated by the sensing system and evaluated by the Detection module 203 until an appropriate detection decision can be made. An alternative approach is to base the decision on a fixed number of transmitted radar pulses. The sequential approach, however, is preferred because it reduces the average number of required pulses by more than half.

The ideal implementation of a sequential detection algorithm requires a decision to be made after every radar pulse. One of three decisions is possible as an outcome: "No Object" 302, "Object Present" 301, and "No Decision" 303. If the latter decision is made, then another pulse is transmitted. It may not be convenient, however, to make a decision after every transmitted pulse. For example, sufficient computational speed may not be available to perform this task at the desired pulse repetition interval (PRI). In this case, the Search Dwell module 304 might transmit more than one pulse between each decision. The number of radar pulses to consider for each decision is a tradeoff between computational requirements and detection performance.

In a preferred embodiment, a certain quantity of pulses greater than one is transmitted between sequential decisions. For this embodiment, the radar receiver integrates this quantity of pulses to generate a single complex value, consisting of in-phase and quadrature component values. This complex value is used to perform each sequential detection decision.

In a preferred embodiment, the detection decision is performed using the sequential probability ratio test (SPRT). The general concepts of SPRT are known (see, e.g., A. Wald, *Sequential Analysis*, New York: Wiley, 1947), although this technique has never been adapted, to the applicants' knowledge, for object-detection use on automotive vehicle radar.

In adapting this approach to automotive radar, a calculated signal magnitude, $m_N$, is considered based on the on-going collection of noisy radar signal observations comprising N such observations. For purposes of description, herein $f_0(m)$ is the probability density function for $m_N$ when an object is actually present at a particular range for a given magnitude, and $f_1(m)$ is the probability density function for $m_N$ when no such object is actually present at a particular range.

A probability density function describes the likelihood of observing particular values of a random variable. In particular, the probability of observing values contained within a certain interval is determined by integrating the probability density function over that interval. As such, the value of the probability density function at any particular value is proportional to the probability of observing the random variable within an infinitesimal interval centered on the value. According to SPRT theory, the ratio, r, provides a measure of the relative probability of the object being present or not:

$$r = \frac{f_1(m_N)}{f_0(m_N)} \quad (1)$$

A decision that an object is present can be made when the following inequality is satisfied:

$$r < B \quad (2)$$

Likewise, a decision that an object is not present can be made when the following inequality is satisfied:

$$r > A \quad (3)$$

If neither inequality is satisfied, then a decision cannot be made and the analysis must be repeated after another radar observation is taken. The thresholds, A and B, can be based on probability of detection (i.e., 1-α) and false alarm (i.e., β) requirements. In particular, Wald suggests the following approximations:

$$A \approx \frac{1-\beta}{\alpha} \quad (4)$$

$$B \approx \frac{\beta}{1-\alpha} \quad (5)$$

In a preferred embodiment, the probability of detection, 1-α, is set to 0.95 (i.e., 95 percent), and the false-alarm rate, β, is set to 0.01 (i.e., 1 percent).

Since radar observations include a significant portion of noise, signal magnitude, $m_N$, is preferably calculated as the coherent integration of the N observations, as described by the following equation:

$$m_N = \sqrt{\frac{I_N^2 + Q_N^2}{N}} \quad (6)$$

wherein $$I_N = i_1 + i_2 + \ldots + i_N$$

$$Q_N = q_1 + q_2 + \ldots + q_N$$

In the above equation, $i_x$ and $q_x$ are the $x^{th}$ noisy radar observation from the in-phase and quadrature radar receiver channels, respectively.

The calculation of the probability density functions, $f_0(m)$ and $f_1(m)$, is dependent on the nature of the observation noise. In a preferred embodiment, the noise on the in-phase and quadrature receiver channels is modeled as independent normal variants having zero mean and equal variance. Under this assumption, the probability density function for the no-object case, $f_1(m)$, follows a Rayleigh distribution:

$$f_1(m) = \frac{m}{\sigma^2} \exp\left(-\frac{m^2}{2\sigma^2}\right) \quad (7)$$

Figure 4:
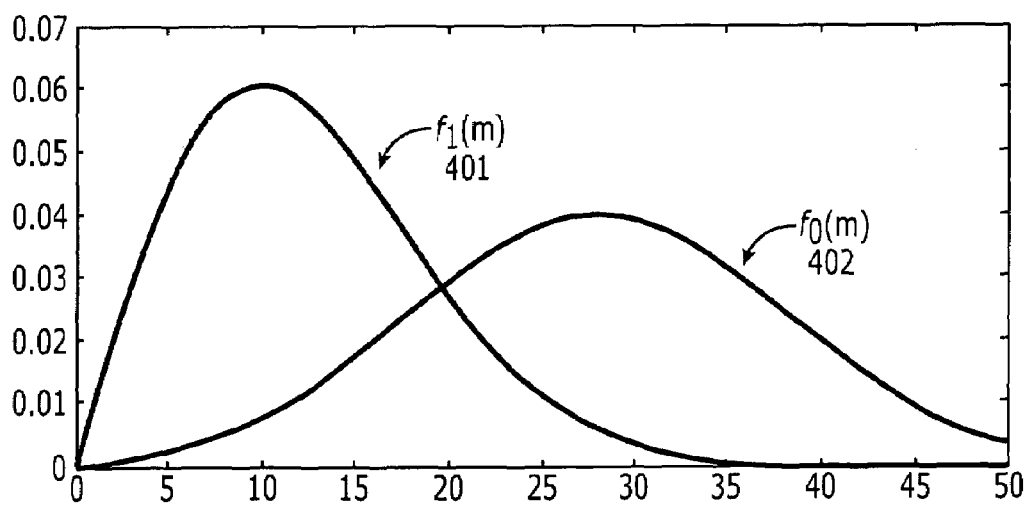
FIG. 4 shows examples of probability density distributions for the situation that an object is present at a particular magnitude for a target range, and for the situation that an object is not present at a particular magnitude at the target range.

In the above equation, $\sigma^2$ is the variance of a receiver channel for a single observation. Note that the probability density function, $f_1(m)$, does not depend on the number of observations, N. This is because the coherent integration definition for signal magnitude, $m_N$, includes a normalization factor to maintain constant variance. FIG. 4 illustrates a Rayleigh distribution 401 for σ equal to 10. Note that the peak of the distribution occurs at the value of σ.

The probability density function 402 for the object-present case, $f_0(m)$, requires an assumed object magnitude. This magnitude has the interpretation that if an object were present with this magnitude, then we would want to achieve the specified probability of detection. Thus, this magnitude is considered to be a threshold at which detection requirements will be satisfied.

Given the above-assumed receiver channel noise characteristics, the probability density function for the object-present case follows a Rice distribution. In a preferred embodiment, this is approximated by the much-simpler Gaussian distribution:

$$f_0(m) = \frac{1}{\sigma\sqrt{2\pi}} \exp\left(-\frac{(m - m_{TN})^2}{2\sigma^2}\right) \quad (8)$$

In the above equation, $m_{TN}$ is the detection threshold at which performance requirements are to be satisfied. The Gaussian distribution is a good approximation to the Rice distribution as long as the threshold, $m_{TN}$, is at least 1.5 times larger than the noise standard deviation, σ. FIG. 4 illustrates the distribution 402 defined in equation (8) for σ equal to 10 and $m_{TN}$ equal to 28. Note that the peak of the distribution occurs at the value of $m_{TN}$.

The threshold, $m_{TN}$, has a dependence on the number of observations, N. For the coherent integration embodiment, it is calculated by the following equation:

$$m_{TN} = m_{T1}\sqrt{N} \quad (9)$$

In the above equations, $m_{T1}$ corresponds to the threshold when only one noisy observation has been collected. The dependence on the number of observations, N, occurs because integration increases the expected object magnitude, and so, in this formulation of the problem, the general shape of the distribution 402, $f_0(m)$, moves toward the right, separating from the stationary distribution 401, $f_1(m)$, with each additional observation. This increases the certainty for which a detection decision can be made.

In a preferred embodiment, the threshold, $m_{T1}$, is determined as a multiple of the effective noise in a receiver channel, as described by the following equation:

$$m_{T1} = D\sigma \quad (10)$$

In the above equation, the parameter D represents the desired noise multiplier. For example, the noise multiplier, D, might have a value somewhere between 2.0 and 5.0. This corresponds to a threshold ranging from 6 dB to 14 dB above noise (i.e., 6 dB=20 $\log_{10}(2.0)$).

In an alternative embodiment, the above-described implementation of the Detection Module 203 is adapted to noncoherent integration. The differences and tradeoffs between coherent and noncoherent integration are well known to one of skill in the art. For example, coherent integration provides a significant advantage in signal to noise ratio. Object phase variation that might be due to radar instabilities or object movement, however, does not affect noncoherent integration. In adapting the previously described embodiment to noncoherent integration, we redefine our signal magnitude, $m_N$, as follows:

$$m_N = \sqrt{(i_N)^2 + (q_N)^2} \quad (11)$$

In contrast to the coherent integration embodiment, the $N^{th}$ signal magnitude, $m_N$, now depends only on the $N^{th}$ coherent observation, $i_N$ and $q_N$. It is also necessary to redefine the SPRT decision ratio, r, as follows:

$$r = \frac{f_1(m_1)f_1(m_2)\dots f_1(m_N)}{f_0(m_1)f_0(m_2)\dots f_0(m_N)} \quad (12)$$

Thus, the probability density functions, $f_1(m)$ and $f_0(m)$, are used with the observed signal magnitudes, $m_1, m_2, \dots m_N$, to calculate the SPRT decision ratio, r. The probability density function, $f_1(m)$, is calculated using equation (7). The probability density function, $f_0(m)$, however, requires a minor modification from that specified by equation (8):

$$f_0(m) = \frac{1}{\sigma\sqrt{2\pi}} \exp\left(-\frac{(m - m_{T1})^2}{2\sigma^2}\right) \quad (13)$$

The threshold, $m_{T1}$, is calculated using equation (10).

Another alternative embodiment that is particularly applicable to radar-radar processing and is a generalization of the coherent embodiment, involves the Fast Fourier Transform (FFT). The calculation and interpretation of FFT data is well known to those skilled in the art. In this embodiment, a complex FFT would be performed using the N noisy observations. The resulting spectral data would be searched for a presence of a peak, whose magnitude value, after appropriate scaling, would provide the calculated signal magnitude, $m_N$.

It remains to describe the estimation of σ, the standard deviation of noise present in the in-phase or quadrature receiver channel. This task can be performed using a variety of different techniques well known to those skilled in the art. In a preferred embodiment, σ is calculated using a certain subset of all radar observations over some period of time. In particular, an observation would be included in this subset if and only if it was the first observation for a particular target range for the current sweep, and a no-object decision was determined for that particular target range. The noise parameter, σ, is estimated to be equal to the calculated standard deviation of this specified subset.

Collection Module

Figure 5:
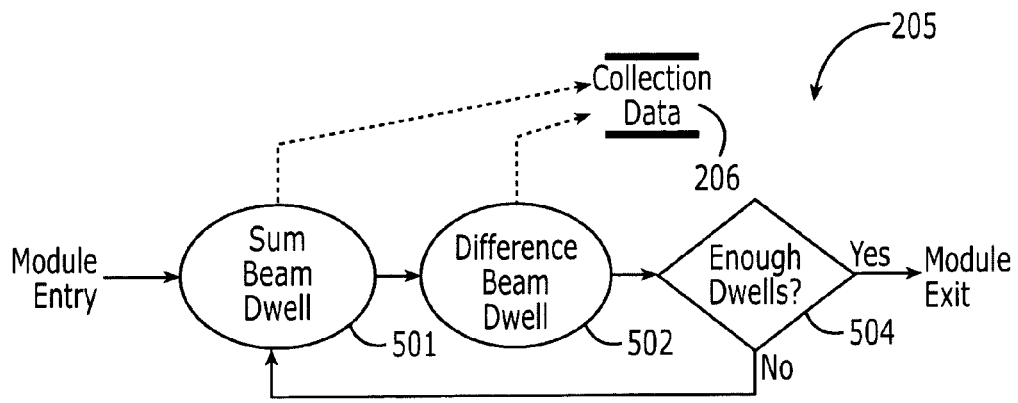
FIG. 5 shows a flow diagram of a preferred embodiment of the collection module of the system shown in FIG. 2.

When it is determined that an object is present at a particular range, additional radar data are immediately collected for subsequent processing. FIG. 5 provides a flow diagram for the Collection module 205. As mentioned above, in a preferred embodiment, the SRR has two overlapping antenna beams, sum and difference, and data from both beams is necessary to estimate object bearing. Accordingly, the collection module 205 shows the collection of radar data from both the sum and the difference beams. To this end, the collection module 205 comprises two submodules: the sum beam dwell submodule 501, which collects radar data using the sum beam, and the difference beam dwell submodule 502, which collects radar data using the difference beam. For each submodule, the radar dwells for a certain number of transmitted pulses. The pulses from each dwell are integrated and output as a single complex value.

The process of collecting sum and then difference-beam radar data is repeated for a certain number of times. In a preferred embodiment, it is repeated for a constant number of times. In an alternative embodiment, it is repeated for a number of times that might depend on factors, such as object range, estimated object signal-to-noise ratio, etc.

During each dwell, data are collected from the in-phase and quadrature radar receiver channels, and placed in the Collection Data store 206. The Collection module exits when the decision 504 is made that all required data for a particular target range has been collected and stored.

State Estimation Module

Figure 6:
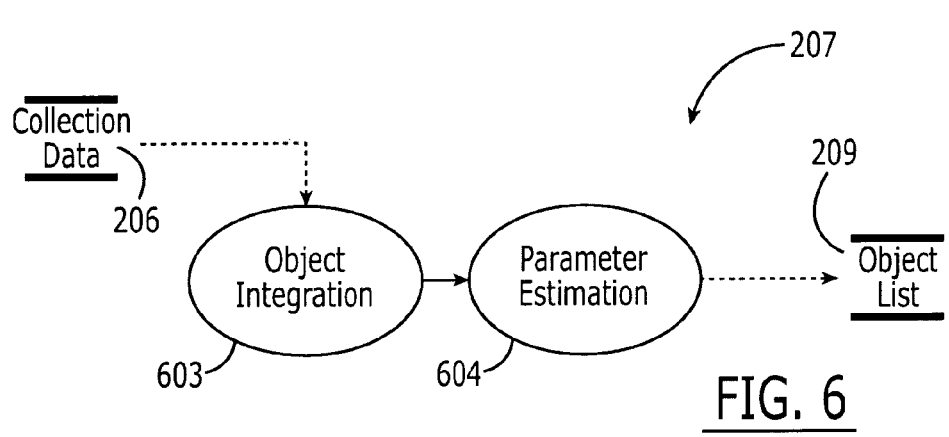
FIG. 6 shows a flow-diagram of a preferred embodiment of the state-estimation module of the system shown in FIG. 2.

FIG. 6 provides a flow diagram for the State Estimation module 207. This module uses data from the Collection Data store 206 to estimate the state or target parameters of detected objects. As used herein, the term "target parameters" refers to calculations derived from a series of radar data relating to the observed object's position and movement relative to the vehicle, and, includes, for example, range, bearing, and Doppler velocity. The module output comprises a description of all detected objects and is placed in the Object List store 209.

The first submodule is Object Integration 603. This submodule obtains data for a particular bin previously gathered by the Collection module, and performs separate integration operations on the sum and difference beam data. In a preferred embodiment, this submodule performs a complex FFT on the data from each beam. In an alternative embodiment, this submodule performs coherent integration on the data from each beam. In a third embodiment, this submodule performs noncoherent integration on the data from each beam. As described earlier, there are well known tradeoffs between the use of coherent and noncoherent integration. The FFT embodiment, however, is preferred because it preserves the signal-to-noise ratio advantage of coherent integration, without introducing degradation due to object movement. The FFT embodiment also provides the ability to estimate Doppler velocity for the object.

The second submodule is Parameter Estimation 604. This submodule accepts the integrated data for each bin, as generated by the Object Integration submodule. The purpose of this submodule is to estimate parameter values for every detected object. In a preferred embodiment, these parameters consist of range, bearing, and Doppler velocity.

In the FFT embodiment, the output of the Object Integration module 603 is spectral data providing magnitude and phase values over a discrete number of frequency bins. As is well known to those skilled in the art, an FFT transforms data from a sampled time domain to a sampled frequency domain (i.e., frequency bins) representation. In a preferred embodiment, the frequency location of a magnitude peak in the sum-channel spectral data determines the Doppler velocity for the object. Methods for calculating Doppler velocity from Doppler frequency are well known to those skilled in the art.

In one embodiment, the estimated Doppler frequency is equal to the bin frequency containing the maximum magnitude value. In a preferred embodiment, the Doppler frequency is more accurately determined through an interpolation method involving one or more neighboring values of the maximum magnitude value. The interpolation may involve refinement of the estimated frequency, magnitude, and/or phase value of the underlying spectral peak. Methods for performing spectral interpolation are well known to those skilled in the art. In another embodiment, the possibility is reserved to identify more than one local maximum in the spectral data, and to estimate the subsequent parameters associated with each local maximum as a separate object. In yet another embodiment, the difference-channel data may be searched for the presence of spectral peaks in order to identify and to estimate the parameters of objects not readily observable in the sum-channel data.

Given the identification of a spectral peak in the sum or difference channel, the value of the other channel (i.e., difference or sum, respectively) at the same frequency is now determined. In a preferred embodiment, the resulting complex values in the sum and the difference channels are used to determine object bearing. This technique, as well as various alternative implementations relating to monopulse antenna theory, is well known to those skilled in the art.

Finally, object range can be estimated. In one embodiment, object range is determined based on the range of the bin in which the radar data was collected. In some implementations, however, a single physical object may be detected in several adjacent range bins. In a preferred embodiment, interpolation in range is used to estimate the location of the magnitude peak. The interpolated range value provides the estimated object range.

Once the target parameters are calculated, they can be further processed by tracking algorithms, fused with targets generated by other SRR sensors, fused with targets generated by sensors implementing technologies other than SRR, and/or used by a number of vehicle applications such as parking aid, stop & go, and pre-crash detection. Additionally, it is expected that, over time, additional applications will be developed utilizing detected SRR targets.

System Architecture

Figure 7:
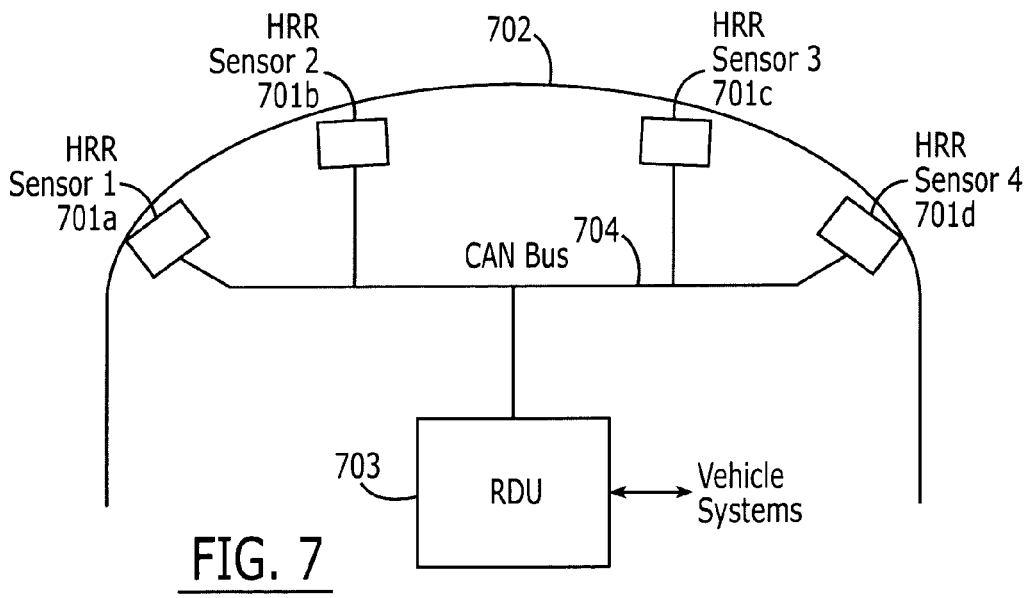
FIG. 7 shows a typical vehicle radar installation.

It is anticipated that the process of the present invention may be practiced in any of a number of system configurations. Essentially, the process requires a system that has one or more sensing systems. Preferably, the process is practiced in a system which exists or has other functionality, for example, a system used for automated cruise control (ACC) or stop & go traffic. Referring to FIG. 7, a typical SRR vehicle installation is shown. Four SRR sensors 701(*a*)-701(*d*) are installed behind the fascia of the front bumper 702. It should be understood that a similar system of SRR sensors may be installed on the side and rear portions of the vehicle.

Currently employed SRR sensors are capable of detecting objects in range and bearing out to a maximum distance of 30 meters. It is anticipated that future generations of SRR sensors will have greater range. The sensors communicate to a central computer called the Radar Decision Unit (RDU) 703 through an automotive Controller Area Network (CAN) bus 704. The RDU 703 is responsible for sensor fusion, and the implementation of vehicle applications. Applications for a front-bumper system might include parking aid, stop & go cruise control (i.e., vehicle automatically maintains appropriate distance to a followed vehicle in stop & go traffic conditions), in addition to a collision detection application. Preferably, the system of FIG. 2 resides in the software of the sensor system, although alternative embodiments exist. For example, portions of the system of FIG. 2 might reside in a separate electronic control unit (ECU). Therefore, the degree to which the computational analysis is distributed among the various sensors or aggregated within one or more processing units, is a question of optimization which one skilled in the art can perform in light of this disclosure.

What is claimed is:

1. A process of determining target parameters of an object within a field of detection of an automotive radar system, said process comprising the steps of:
   (a) establishing a target range from a sequence of ranges provided by an automotive radar system secured to a vehicle;
   (b) dwelling on said target range for an initial dwell time to obtain radar data;
   (c) determining if said radar data corresponds to the presence of an object or to the absence of an object at said target range based on probability density distributions of an object being present and being absent at said target range, and if such said determination cannot be made, then repeating steps (b) and (c) until said determination can be made;
   (d) if said radar data is determined to correspond to the presence of an object in step (c), then dwelling at said target range for an extended dwell time to obtain additional radar data for determining the target parameters of said object before proceeding to step (e); and
   (e) establishing the next of said sequence of ranges as the target range before reiterating steps (b)-(e).

2. The process of claim 1, wherein, in step (c), said determination is made using a sequential probability ratio test (SPRT).

3. The process of claim 1, wherein, in step (c), an object is determined present if r<B and an object is determined absent if r>A, wherein, $$r = \frac{f_1(^mN)}{f_0(^mN)}$$

$f_0(m)$ is the probability density function when an object is actually present at a particular range for a given radar value, $f_1(m)$ is the probability density function when no such object is actually present at a particular range for the given radar value, $m_N$ is calculated signal magnitude based on the on-going collection of noisy radar signal observed within N observations, $$A \approx \frac{1-\beta}{\alpha},$$

$$B \approx \frac{\beta}{1-\alpha},$$

1-α is the probability of detection and
β is the probability of a false alarm.

4. The process of claim 3, wherein 1−α is about 0.95, and β about 0.01.

5. The process of claim 3, wherein $$f_0(m) = \frac{1}{\sigma\sqrt{2\pi}} \exp\left(-\frac{(m-m_{TN})^2}{2\sigma^2}\right), \text{ and}$$

$$f_1(m) = \frac{m}{\sigma^2} \exp\left(-\frac{m^2}{2\sigma^2}\right),$$

wherein
 σ a is the standard deviation of noise present in the radar data,
 $m_N$ is a calculated signal magnitude based on the on-going collection of noisy radar signal observed within N observations,
 $m_{TN}$ is the detection threshold at which performance requirements are to be satisfied.

6. The process of claim 5, wherein mm is at least 1.5 times larger than σ.

7. The process of claim 1, further comprising:
 (f) determining target parameters based on additional radar data obtained in step (d).

8. The process of claim 7, wherein said target parameters comprise range, bearing, and Doppler velocity.

9. The process of claim 7, wherein target parameter data is transmitted to a processor to support a vehicular application selected from at least one of a parking aid, stop & go, or pre-crash detection.

10. The process of claim 7, wherein said step (f) is performed after step (b) is performed on all ranges in said sequence of ranges.

11. The process of claim 7, wherein said step (f) is performed after each step (c) is performed.

12. The process of claim 1, wherein said initial dwell is based on obtaining a fixed number of radar data.

13. The process of claim 1, wherein, in step (c), if a determination cannot be made whether said data corresponds to the presence of an object or the absence of an object, than increasing said initial dwell time to obtain additional radar data.

14. The process of claim 1, wherein said initial dwell is terminated once a decision is made in step (c).

15. The process of claim 14, wherein said extended dwell time begins immediately after a decision is made in step (c) that an object is present.

16. The process of claim 1, wherein said extended dwell time is fixed.

17. The process of claim 1, wherein said extended dwell time is based on at least one of object range and estimated signal to noise ratio.

18. The process of claim 1, wherein the ratio of extended dwell time to initial dwell time of step (b) is greater than two.

19. The process of claim 1, wherein said radar data is radar data comprising a complex value having in-phase and quadrature components.

20. The process of claim 1, wherein coherent or noncoherent integration is used in step (b).

21. The process of claim 1, wherein an FFT is used on the extended dwell time data to estimate target parameters.

22. A system for sensing objects about the perimeter of a vehicle, said system comprising at least one computer being configured to perform the following steps:
 (a) establishing a target range from a sequence of ranges provided by an automotive radar system secured to a vehicle;
 (b) dwelling on said target range for an initial dwell time to obtain radar data;
 (c) determining if said radar data corresponds to the presence of an object or to the absence of an object at said target range based on probability density distributions of an object being present and being absent at said target range, and, if the presence or absence of said object cannot be determined, repeating steps (b)-(c);
 (d) if said radar data corresponds to the presence of an object as determined in step (c), then dwelling at said target range for an extended dwell time to obtain additional radar data for determining the target parameters of said object before proceeding to step (e); and
 (e) establishing the next of said sequence of ranges as the target range before reiterating steps (b)-(e).

23. A system in combination with a vehicle radar system for sensing objects about the perimeter of a vehicle, said system comprising:
 a data processor;
 an input for receiving radar data from said vehicle radar system;
 memory operatively connected to said data processor, said memory containing instructions comprising at least:
  a detection module for establishing a target range from a sequence of ranges, instructing said vehicle radar system to dwell on said target range for an initial dwell time to obtain radar data, and determining if said radar data corresponds to the presence of an object or to the absence of an object at said target range based on probability density distributions of an object being present and being absent at said target range, and repeating the initial dwell time to collect more radar data if the presence or absence of said object cannot be determined;
  a collection module for dwelling at said target range for an extended dwell time after said detection module determine an object to be present to obtain additional radar data for determining the target parameters of said object; and
  a state estimation module for determining target parameters of said object from said addition radar data.

24. A vehicle comprising:
 a vehicle radar system for radar data, said system comprising;
 a data processor;
 an input for receiving radar data from said vehicle radar system;
 memory operatively connected to said data processor, said memory containing instructions comprising at least:
  a detection module for establishing a target range from a sequence of ranges, instructing said vehicle radar system to dwell on said target range for an initial dwell time to obtain radar data, and determining if said radar data corresponds to the presence of an object or to the absence of an object at said target range based on probability density distributions of an object being present and being absent at said target range, and repeating the initial dwell time to collect more radar data if the presence or absence of said object cannot be determined;
  a collection module for dwelling at said tar get range for an extended dwell time after said detection module determine an object to be present to obtain additional radar data for determining the target parameters of said object; and
  a state estimation module for determining target parameters of said object from said addition radar data.

* * * * *